Figure 1:
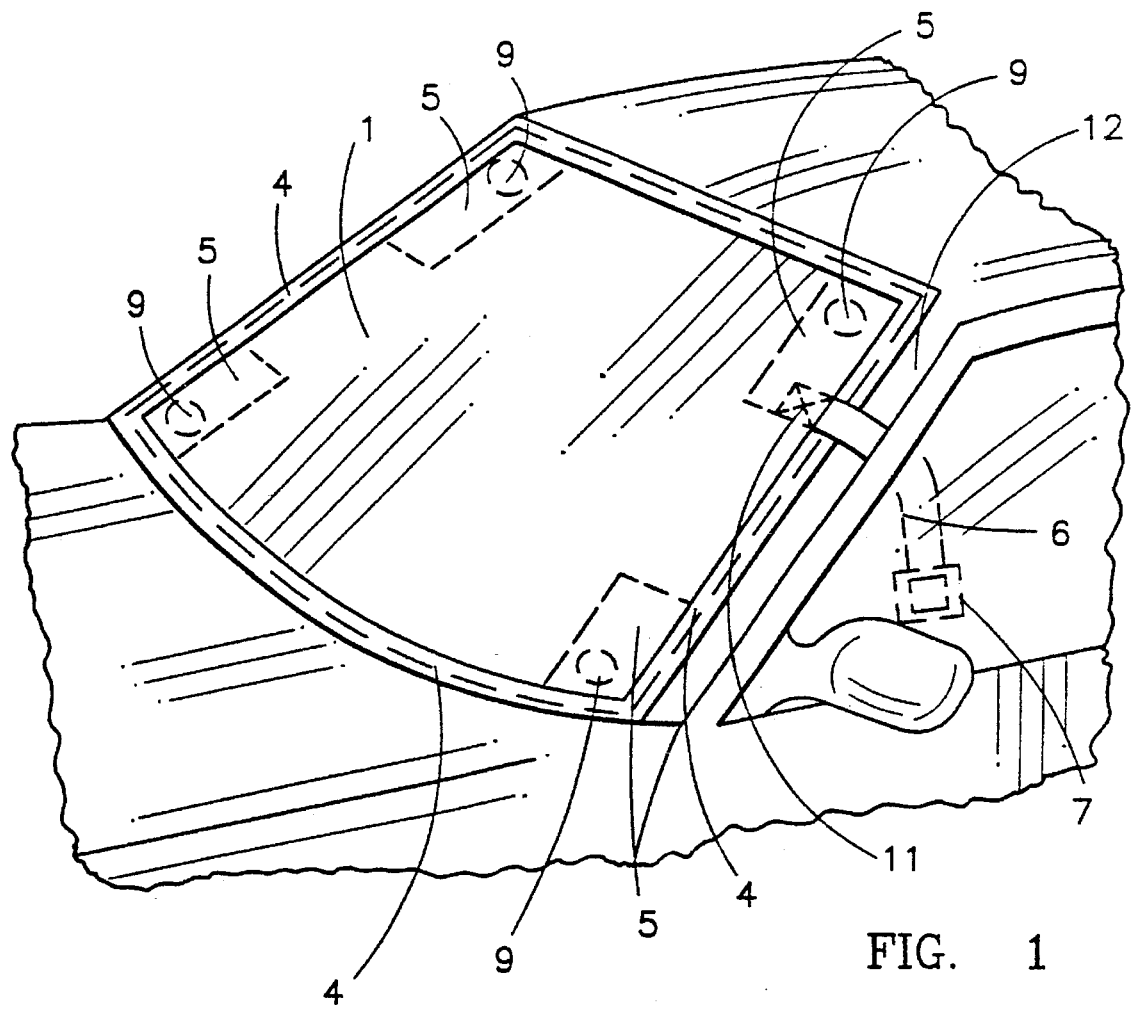
Figure 2:
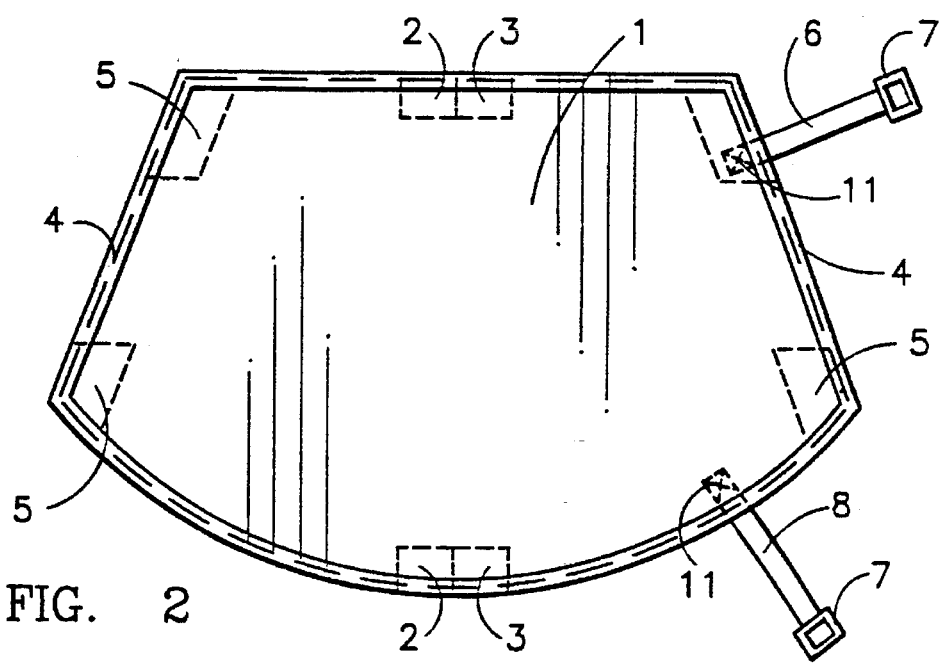
Figure 3:
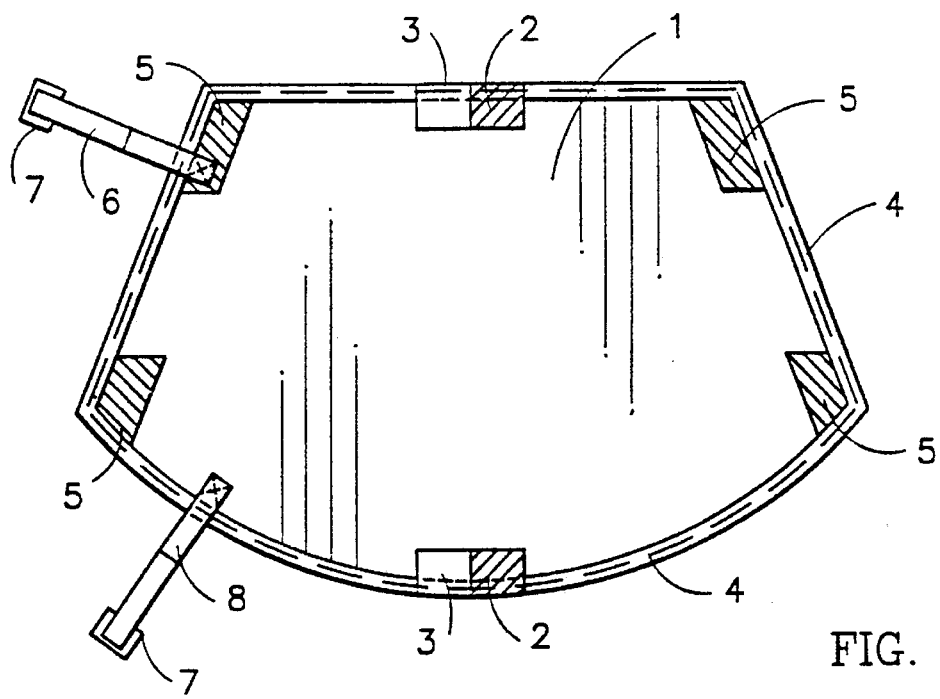
Figure 4:
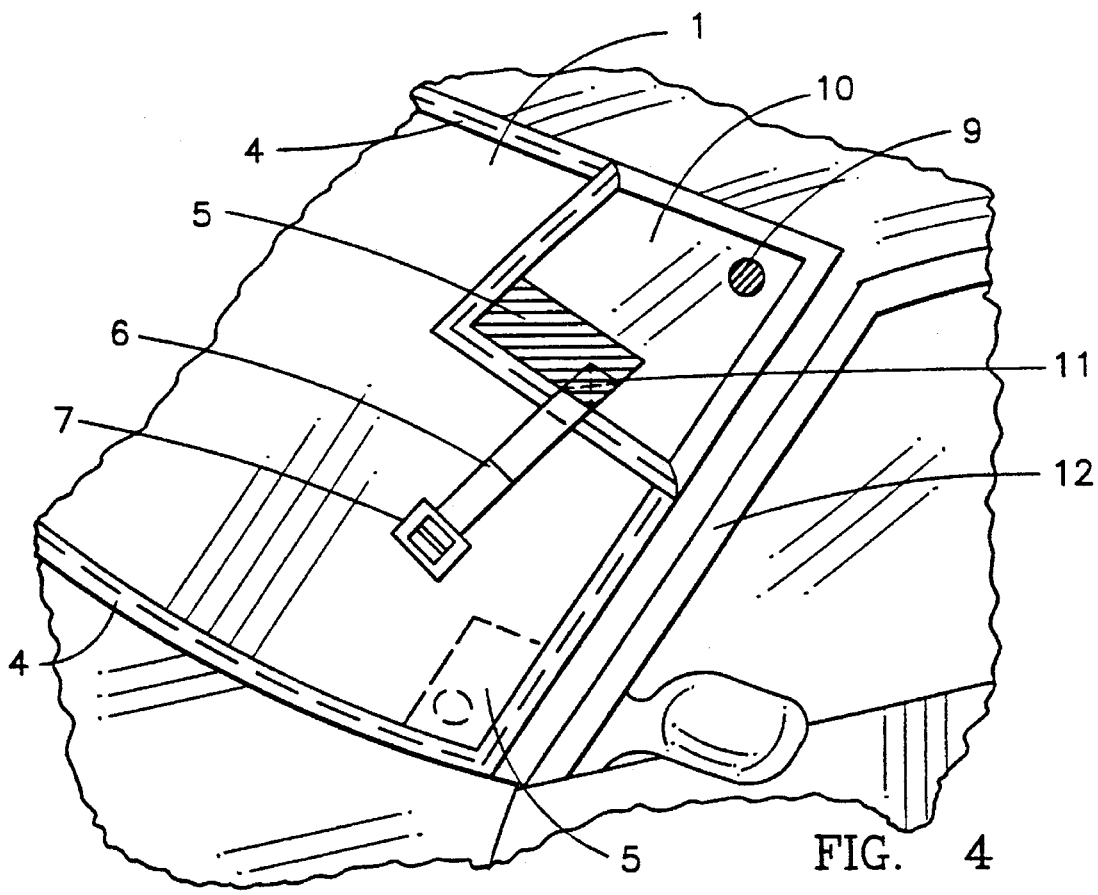

United States Patent [19]

Madison

[11] Patent Number: 5,615,923
[45] Date of Patent: Apr. 1, 1997

[54] COVER FOR VEHICLE WINDOW

[76] Inventor: Donald T. Madison, 1209 Park Green Pl., Winter Park, Fla. 32789

[21] Appl. No.: 523,496

[22] Filed: Sep. 1, 1995

[51] Int. Cl.⁶ ........................................................ B60J 3/00
[52] U.S. Cl. ............................... 296/95.1; 160/370.21
[58] Field of Search ........................... 296/95.1, 97.7, 296/97.8, 136; 150/166, 168; 160/370.21, 370.23, DIG. 3

[56] References Cited

U.S. PATENT DOCUMENTS

| | | | |
|---|---|---|---|
| 4,790,591 | 12/1988 | Miller | 296/97.7 X |
| 4,966,406 | 10/1990 | Tremaine et al. | 296/95.1 |
| 5,035,460 | 7/1991 | Huang | 296/95.1 |

*Primary Examiner*—Joseph D. Pape
*Attorney, Agent, or Firm*—Brian S. Steinberger; Law Office of Brian S. Steinberger

[57] ABSTRACT

A windshield protective cover for front and rear, inside or outside vehicle windows, includes a dual sided reflective silver/silver coated or laminated polyethylene with a fiber inner scrim for strength material, that attaches to windshields. The cover, when patterned in a limited variety of adjustable sizes or custom unlimited patterns for a vehicle's windshield attaches to a window and held in place by adhesive Velcro hook dots or strips affixed to the window and Velcro loop strips sewn on the under side or back of the cover. The cover has a binding made of the same material sewn around the border of the cover. The cover also has lock straps made of the same material attached and sewn to the cover material, between the velcro loop strip and the back cover. The strap has a buckle attached on one end, that deters the cover from theft by being closed inside the driver's side door or the trunk. Some adjustable covers will also have an additional strap sewn on the bottom portion of the cover to secure the rear windshield cover, by closing the buckled end strap in the trunk. All adjustable covers will have a special Velcro hook and loop strip centered at the top and bottom of the cover that allows the cover to adjust the width inward to fit a variety of windshields.

7 Claims, 3 Drawing Sheets

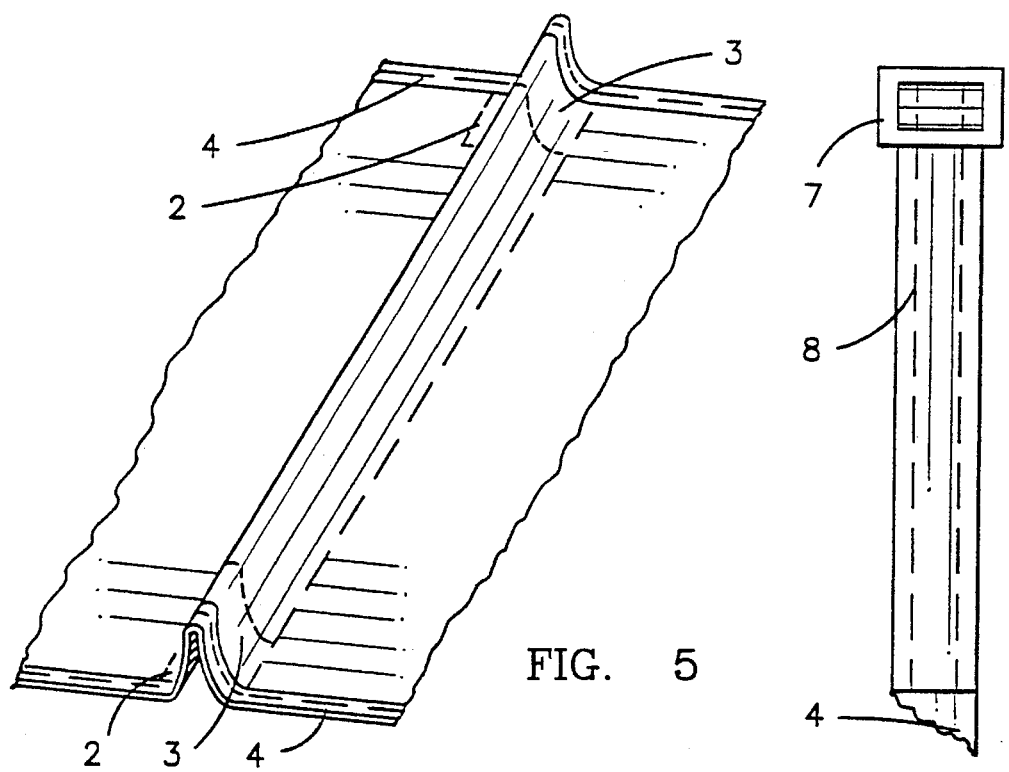
FIG. 5
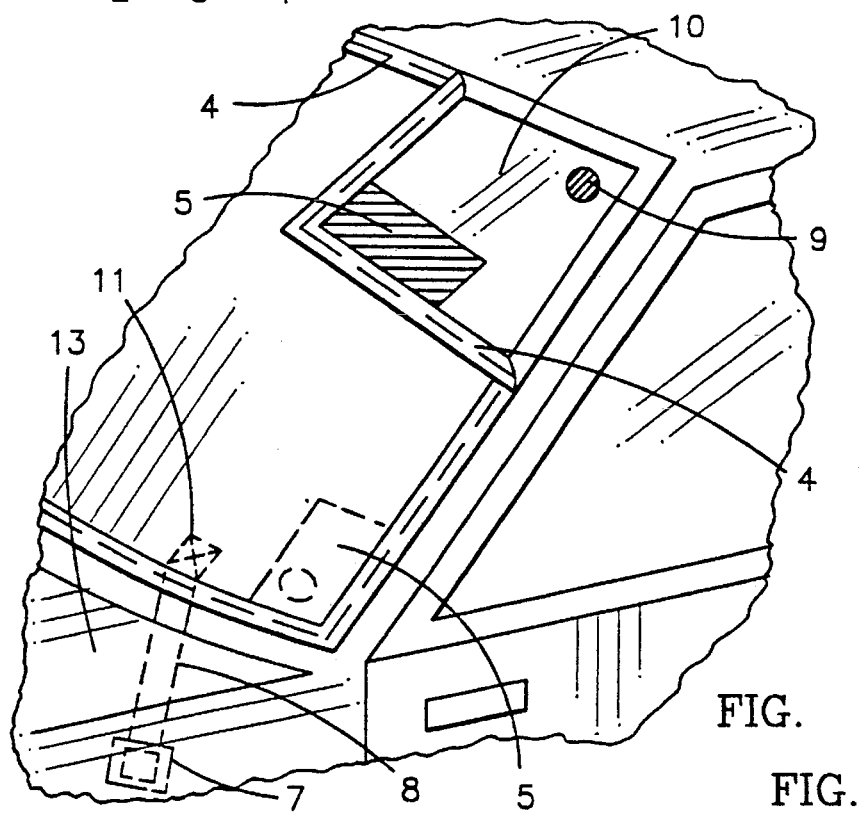
FIG. 6
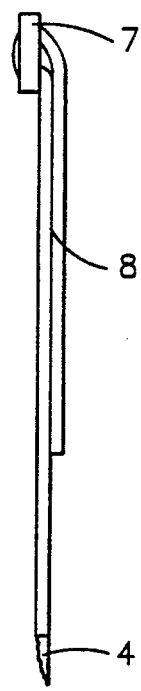
FIG. 7
FIG. 8

COVER FOR VEHICLE WINDOW

BACKGROUND OF THE INVENTION

The present invention relates generally to a vehicle's accessories and more particularly, to a flexible cover adapted for placement over the exterior or interior surface of vehicle windows, such as the windshield. The cover protects the windshield from various environmental factors including the buildup of frost, snow, ice and dirt. The cover is also adapted to block and reflect sunlight thereby substantially preventing the penetration of ultraviolet light and the buildup of heat in the interior of the vehicle.

DESCRIPTION OF RELATED PRIOR ART

It has long been known to utilize covers for vehicles to protect the vehicles from various environmental factors including rain, frost, snow, ice, dirt and sunlight. Examples of such devices particularly adapted for application to the windshield of a vehicle include, for example U.S. Pat. No. 2,599,066 to Osborn; U.S. Pat. No. 2,646,118 to Berty; U.S. Pat. No. 4,635,993 to Hooper et al.; U.S. Pat. No. 4,790,591 to Miller; and U.S. Pat. No. 4,726,406 to Weatherspoon, U.S. Pat. No. 5,123,468 to Mater et al. Of these windshield covers or screens, the ones disclosed in the Osborn, Berty, Hooper, Weatherspoon and Mater et al. patents cover the exterior surface of the windshield.

Accordingly, these covers are particularly effective in preventing frost, snow and ice from building up on the windshield in the winter. They are also effective in blocking sunlight and at least a portion of the ultraviolet radiation associated therewith from penetrating the interior of the vehicle. As such, in the summer months these covers function to lower heat buildup within the interior of the vehicle. They also reduce damage to interior vehicle components due to extended application of ultraviolet radiation over time. The covers are also equipped with various mechanisms to prevent theft. For example, the Hooper et al. device incorporates a beaded end flap. More particularly, with the vehicle door open, the end flap is folded around the door frame. The door of the vehicle is then closed so that the beaded end of the flap is held in the interior of the vehicle. Advantageously, since the beaded end is of sufficient dimension so as to engage the door and door frame rather than pull through between them, the cover cannot be stolen from a locked vehicle unless the end flap is cut or the vehicle door is opened such as by manipulation.

While numerous windshield screens or covers of varying design are available in the marketplace, a need for improvements still exists. More specifically, many are inconvenient to utilize.

For example, many are difficult to properly position on the window and are difficult to properly hold in position on the window while being secured to the vehicle to prevent theft. Additionally, many of the covers of the type disclosed in Mater et al. includes clamps that are folded around the door frame and closed within the vehicle door which damage paint in the area of the door frame over time This results from the rubbing action of the flexible material of the cover which can effectively buff the paint from the metal. A need for a vehicle windshield cover of superior design, versatility and flexibility is needed to address these problems.

SUMMARY OF THE INVENTION

Kar-Brella is a new thermo-dynamic vehicle windshield cover specially designed to protect interior and exterior components from HOT and COLD temperature damage.

Kar-Brella's unique all weather exterior protection, shields vinyl, leather interior, and dashboards from cracking and fading due to the sun's blistering heat and ultraviolet rays as well as exterior windows from snow, ice, and frost build-up, therefore eliminating windshield scraping. The hot scorching sun and destructive ultraviolet rays will not penetrate the Kar-Brella sun, ice, and snow cover.

This invention prevents vehicle interiors from sizzling heat buildup that can also damage electronic components, can also be attached to the inside or outside windshield as well as the front and rear outside windshield by adhesive hook or loop dots or strips.

Kar-Brella's unique vehicle windshield covers have a locking strap feature and is made in a limited variety of adjustable sizes for compact, small, medium and large cars, and trucks, and unlimited custom made pattern sizes for all vehicles including trucks and RV's utilizing the same Velcro attachment and theft deterrent lock strap system. The invention's lock strap with a hard buckle attached on the end, locks inside the driver's side door or the trunk for rear windshields makes theft of the cover prohibitive. This strong lightweight material is flexible and durable in extreme heat or frigid weather and needs no special care. The unique combination of specially made materials, unlimited custom made and limited patterned adjustable covers, Velcro hook/ loop adhesive windshield attachment, centered top and bottom adjustment systems and inside or out front and rear windshield application is a invention that is superior to any of the previously patented covers, because of this universal versatility of applications to all vehicles.

The invention, Kar-Brella Sun and Snow Covers surpasses the vehicle industry's need for an answer to high heat and sub-freezing temperature vehicle window cover and is simply the best invention for vehicle windshield protection since the garage.

All other vehicle windshield inventions, exterior and interior front, side and rear screens, window tints and shades presently on the market may attempt to block the sun's ultraviolet rays and prevent heat or ice/snow build-up, but nothing comes close to Kar-Brella's total front and rear exterior and interior windshield protection covers and provides unlimited custom made and limited patterned adjustable windshield covers for any vehicle.

The concern for theft of the Kar-Brella cover is a minor issue primarily because of the major factors that contribute to theft of vehicle items; resale profit. Kar-Brella's one lock strap securing system is designed to deter theft rather than theft proof the cover. To steal a Kar-Brella cover one would have to cut the strap which would prohibit securing to another vehicle, or break into the vehicle to remove the covet it tact. Should a thief want the Kar-Brella cover badly enough no device can prohibit theft although the Kar-Brella cover is worth its weight in gold because of the protection value it offers to vehicles.

DESCRIPTION OF THE INVENTION

The present invention is illustrated in detail according with the accompanying drawings.

Drawings in Brief

FIG. I A perspective view of the custom cover on a vehicle's exterior.

FIG. II A top view of the adjustable vehicle cover laying flat.

FIG. III A back view of the adjustable vehicle cover laying flat.

FIG. IV A fragmentary view of the cover on a vehicle's exterior with the cover pulled back for illustration.

FIG. V A fragmentary view of the adjustable vehicle cover mating system for illustration.

FIG. VI A partial view of a vehicle's rear window cover pulled back for illustration.

FIG. VII Shows a flat view of the lock strap with a hard buckle attached that dealers theft.

FIG. VIII illustrates a side view of the lock strap.

DRAWINGS IN DETAIL

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. I Shows the custom pattern cover (1) on the vehicle's windshield with the Velcro loop strip (5) attached and mated to the Velcro adhesive dots or strips (9).

The lock strap (6) is enclosed between the vehicle's body and the driver's side door (12) and is secured inside the vehicle by a hard buckle (7) on the end of the strap. It cannot be pulled through the door when closed. The strap (6) is sewn and attached (11) to the cover (1) between the velcro loop strip (5) and the binding (4). The strap (6) and the binding material (4) is made of the same material as the cover (1).

FIG. II is a front view of an adjustable patterned cover with two lock straps (6 & 8) with a buckle (7) attached to secure it from theft. The adjustable windshield cover has two sets of Velcro hook and loop (2 & 3) sewn to the center top and bottom portions of the cover (1). The velcro hook (2) and the Velcro loop (3) when mated causes the cover (1) to adjust the width size inward to fit the vehicle's windshield, as well as attach the velcro loop strips (5) to mate and fasten to the adhesive hook dots (9) or strips attached to the windshield.

FIG. III shows a backside view of the cover which is identical to the front cover (1). This dual sided material design allows for the cover (1) to be attached inside the vehicle as well as outside. The drawing also shows the adjustable velcro hook (2) and loop (3) centered at the top and bottom of the shield cover (1).

The front lock strap (6) may also serve as a side rear lock strap (6) for hatchbacks, station wagons, etc. and other rear window vehicle windshield attachments to deter theft of the cover (1).

FIG IV is a fragmentary view of the cover (1) on a vehicle showing the cover (1) pulled back to illustrate the velcro adhesive dot or strips attached to the vehicle's glass windshield (10). This view also shows a view of the lock strap (6) is sewn attached (11) to the cover (1) between the Velcro loop strip.

FIG V is a featured view of the adjustable centered top and bottom Velcro hook (2) and loop (3) system. Shown here mated (2 & 3) that draws the cover (1) inward to the windshield width size. The hook (2) portion of the center top and bottom cover has a special strength hook designed so when mated with Velcro loop (3) fastens substantially stronger than regular hook and loop mating materials. This special strength Velcro will hold the adjusted size of the cover in place which will eliminate readjusting the cover each time the cover is put on the same vehicle.

FIG VI is a drawing fragmented rear view of a vehicle cover pulled back in order to show the cover's velcro loop strip (5) and the velcro adhesive dot (9) or strip attached to the windshield (10).

This drawing also shows the rear window's cover's lock strap (8) with buckle (7) attached inside the vehicle's trunk to deter theft.

FIG. VII This is a flat view of the lock strap made of the same material (2) as the cover with a buckle (1) and would be attached to the cover (4) the buckle is looped by the strap and sewn (3) to secure it to the strap and will not allow the strap to be pulled through the door and the body of a vehicle or the trunk.

FIG. VIII is a side view of the lock strap.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A windshield protective cover for being attached to the exterior of a front vehicle window and a rear vehicle window comprising:

a flexible cover sized to fit over an exterior of front and rear windows of a vehicle;

hook and loop fasteners on interior surface edges of the flexible cover for attaching and detaching to mateable hook and loop fasteners attached to the exterior of the vehicle front and rear windows;

a first flexible strap having one end sewn to the flexible cover and a second end;

a first buckle attached to the second end by a sewn loop formed from the second end of the first flexible strap, the first buckle being inserted into an interior compartment of the vehicle;

a first width adjustment fastener strip attached to an upper middle interior surface of the flexible cover; and a second width adjustment fastener strip attached to a lower middle interior surface of the flexible cover, wherein the first and the second width adjustment fastener strips allow for middle portions of the flexible to be folded when fitting the flexible cover over different sized windows.

2. The windshield protective cover of claim 1, wherein the flexible material includes:

a flexible material duel sided silver/silver coated with an inner scrim, ultra-violet stabilized, nonporous polyethylene.

3. The windshield protective cover of claim 1, wherein the hook and loop fasteners includes:

Velcro®.

4. The windshield protective cover of claim 1, wherein the hook and loop fasteners are positioned adjacent four exterior corners of the flexible cover.

5. The windshield protective cover of claim 1, further comprising:

a second flexible strap having one end sewn to the flexible cover and a second end; and a second buckle attached to the second end by a sewn loop formed from the second end of the second flexible strap, the second buckle for being inserted into the vehicle interior compartment through doors and trunk lid of the vehicle.

6. The windshield protective cover of claim 1, wherein the first and the second width adjustment fastener strips include:

hook and loop fasteners.

7. A windshield protective cover for being attached to the exterior of a front vehicle window and a rear vehicle window comprising:

a flexible cover sized to fit over an exterior of front and rear windows of a vehicle, the flexible cover being duel sided silver/silver coated with an inner scrim, ultraviolet stabilized, nonporous polyethylene;

hook and loop fasteners on interior surface edges of the flexible cover for attaching and detaching to mateable hook and loop fasteners attached to the exterior of the vehicle front and rear windows;

a first flexible strap having one end sewn to the flexible cover and a second end;

a first buckle attached to the second end by a sewn loop formed from the second end of the first flexible strap;

a second flexible strap having one end sewn to the flexible cover and a second end; and a second buckle attached to the second end by a sewn loop formed from the second end of the second flexible strap, the first buckle and the second buckle for being inserted into the vehicle interior compartment through doors and trunk lid of the vehicle;

a first width adjustment fastener hook and loop fastener strip attached to an upper middle interior surface of the flexible cover; and a second width adjustment hook and loop fastener strip attached to a lower middle interior surface of the flexible cover, wherein the first and the second width adjustment fastener strips allow for middle portions of the flexible cover to be folded when fitting the flexible cover over different sized windows.

\* \* \* \* \*